United States Patent [19]
Rusch et al.

[11] Patent Number: 5,873,450
[45] Date of Patent: Feb. 23, 1999

[54] APPARATUS AND METHOD FOR UP-ENDING WORKPIECES

[75] Inventors: Christopher J. Rusch, Two Rivers, Wis.; John E. Nordstrom, 4717 River Heights Dr., Manitowoc, Wis. 54220

[73] Assignees: John E. Nordstrom; Barbara A. Norstrom, both of Manitowoc, Wis.

[21] Appl. No.: 819,685

[22] Filed: Mar. 17, 1997

[51] Int. Cl.⁶ .................................................. B65G 47/24
[52] U.S. Cl. .......................................................... 198/415
[58] Field of Search .................... 198/415, 411, 198/626.6

[56] References Cited

U.S. PATENT DOCUMENTS

| | | |
|---|---|---|
| 2,162,457 | 6/1939 | Laxo . |
| 3,178,007 | 4/1965 | Standley et al. . |
| 3,194,382 | 7/1965 | Nigrelli et al. . |
| 3,403,771 | 10/1968 | Gardiner et al. . |
| 3,462,001 | 8/1969 | Boyce ....................................... 198/415 |
| 3,578,141 | 5/1971 | Shechman ............................... 198/415 |
| 3,640,375 | 2/1972 | Reimers . |
| 3,682,292 | 8/1972 | Drew . |
| 4,564,104 | 1/1986 | Anderson . |
| 4,653,628 | 3/1987 | Claypool et al. ....................... 198/415 |
| 5,050,724 | 9/1991 | Nordstom ............................... 198/415 |
| 5,082,100 | 1/1992 | Guyonneau ........................... 198/626.1 |
| 5,301,793 | 4/1994 | Kovacs ..................................... 198/415 |
| 5,341,912 | 8/1994 | Focke et al. ............................ 198/415 |
| 5,358,092 | 10/1994 | Cinotti ..................................... 198/415 |

FOREIGN PATENT DOCUMENTS

| | | |
|---|---|---|
| 3232364A | 3/1984 | Germany ............................... 198/415 |
| 0230414 | 9/1988 | Japan . |
| 2103168 | 2/1983 | United Kingdom . |

*Primary Examiner*—William E. Terrell
*Assistant Examiner*—Khoi H. Tran
*Attorney, Agent, or Firm*—Ryan Kromholz & Manion, S.C.

[57] ABSTRACT

An infeed conveyor for a packaging machine having a first squeezer conveyor including upper and lower belts spaced to receive workpieces in an end-to-end relationship. Upper speed-up rollers and lower speed-up rollers advance the workpieces further along the path of the first squeezer conveyor. A second conveyor being provided for receiving the workpieces from the speed-up rollers. A third conveyor being positioned above the second conveyor and operating at a lower rate of speed whereby when an upper leading edge of a workpiece engages with the third conveyor, the workpiece is rotated approximately ninety-degrees from its previous orientation. Flight bars rotate with the second conveyor at a rate faster than the second conveyor thereby bunching the workpieces into abutting groups of a predetermined size for entry into a packaging machine.

5 Claims, 4 Drawing Sheets

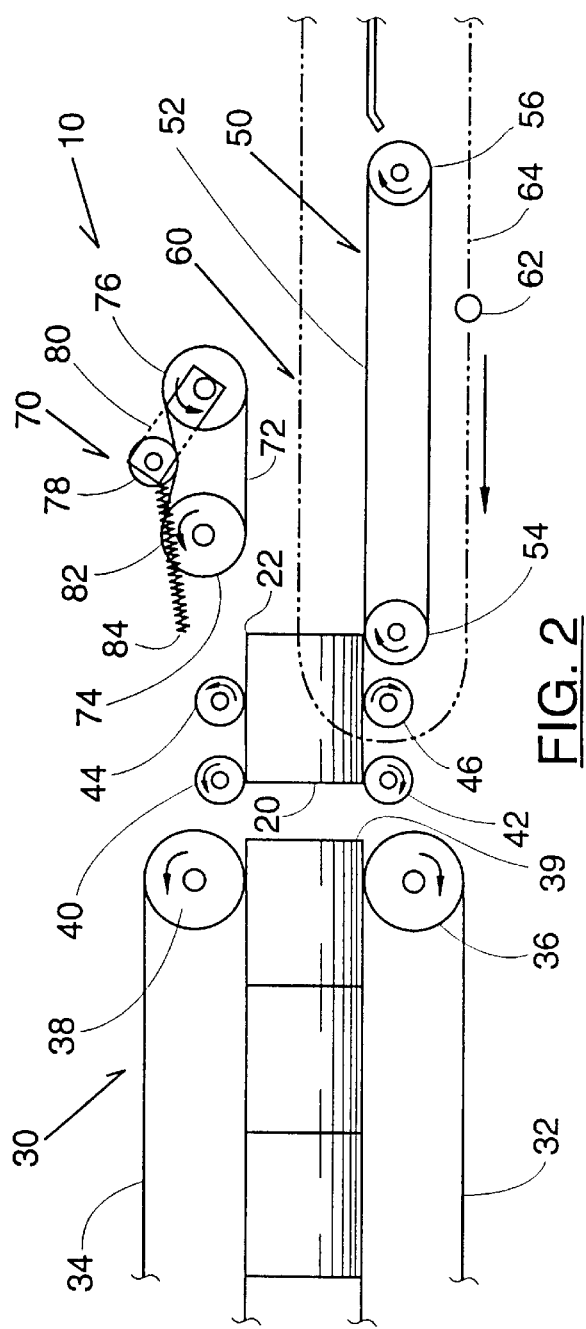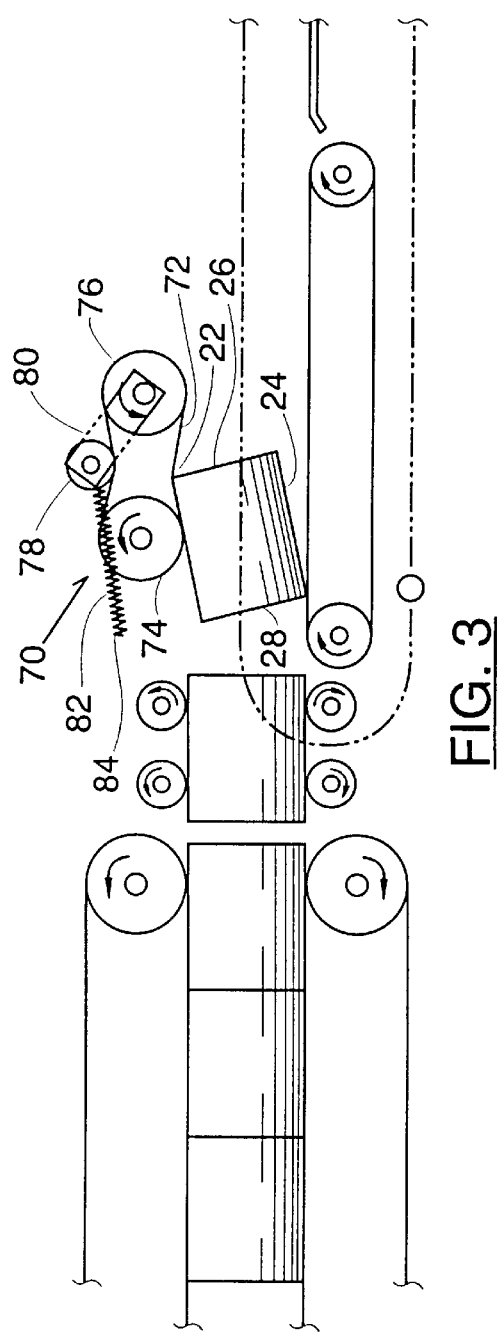

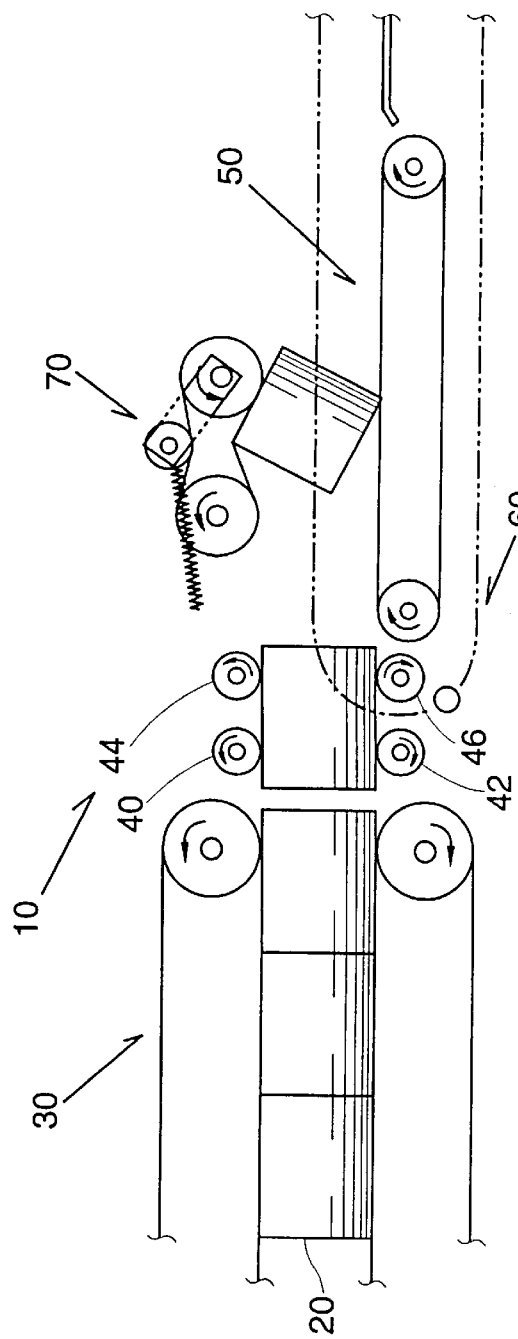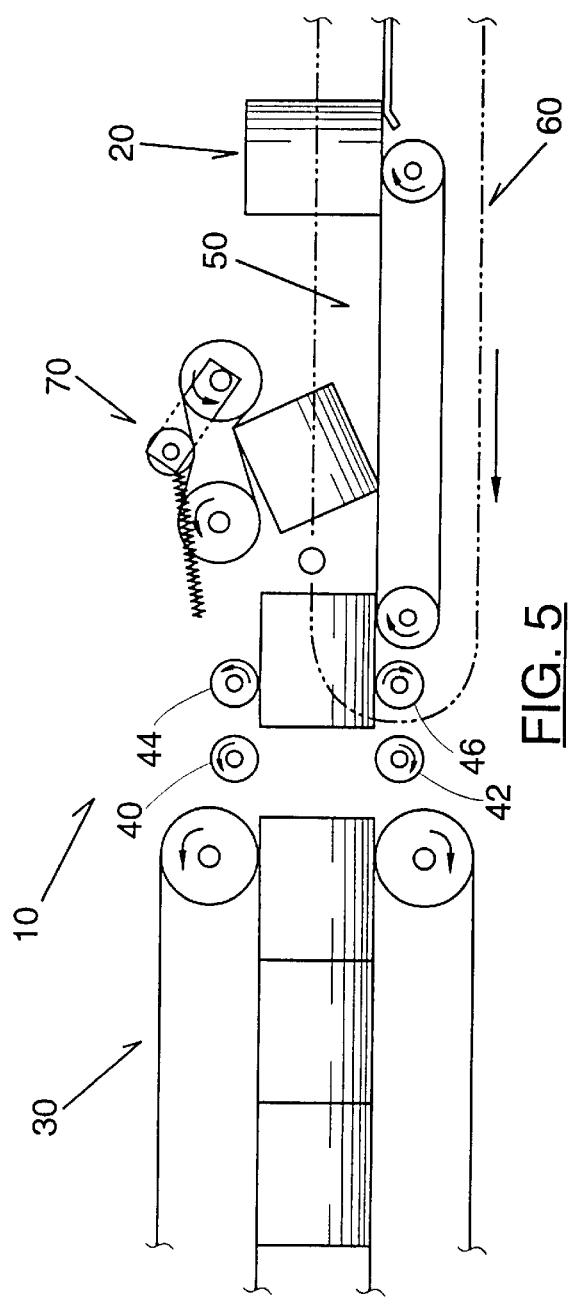

APPARATUS AND METHOD FOR UP-ENDING WORKPIECES

BACKGROUND OF THE INVENTION

In the United States, infeed conveyors for rolls of paper products such as bathroom tissue (BRT) and household towel (HHT) have fed the respective rolls or workpieces into a packaging machine in a direction which is axial with respect to the cylindrical rolls of paper. In Europe, the rolls of paper product are typically fed into the packaging machine with the roll moving in a radial direction. The European roll is wrapped with a different style of package and with the seal differently oriented with respect to the surfaces and the advertising material printed on the wrapping film.

In the paper industry, paper products such as BRT and HHT are produced from paper made by paper making machines. The base paper from the paper making machines is wound at the machine output into large rolls commonly referred to as parent rolls. The parent rolls are then transported to a paper converting area where the paper product is unwound from the parent roll and re-wound into a smaller roll commonly known as a log. The diameter of a log is equivalent to the diameter of a finished roll of BRT or HHT. However, a log is typically ten to fifteen feet long. The log is transported to a cutting machine having one or more blades that cut the log at predetermined intervals into the length of roll product that is ultimately sold to the consumer. After being cut, the individual rolls of BRT or HHT are transported by a supply conveyor to a wrapping machine where the rolls are subsequently wrapped.

Because the supply conveyor contains a continuous supply of rolls whose ends abut one another, it is necessary to utilize an infeed conveyor in order to separate each roll of BRT or HHT and group a predetermined number of rolls (if necessary) prior to feeding each roll or each group of rolls into the packaging machine. This is accomplished through the use of an infeed conveyor. Infeed conveyors which are utilized for separating and regrouping rolls of BRT or HHT are well known in the art. See for example U.S. Pat. No. 4,360,098 (Nordstrom). This prior art infeed conveyor receives product rolls or workpieces from the supply conveyor in a direction which is axial with respect to the cylindrical rolls of paper. The rolls are separated and grouped prior to being fed into the packaging machine in the same direction. This infeed conveyor is commonly used in the United States as well as other foreign countries.

The present invention, in addition to separating and grouping the rolls of paper product, rotates or up-ends each roll so that each roll of paper product is fed into the packaging machine with the roll moving in a radial direction. As previously noted, many European wrapping machines require the workpieces conveyed into the wrapping machine to be oriented in this direction. It is an object of this invention to provide an infeed conveyor which can, in addition to separating and grouping rolls of paper product, rotate or up-end rolls of paper product for a packaging machine which requires each roll to have the radial orientation prior to being fed into the packaging machine. It is an object to provide an apparatus for up-ending rolls of paper product that is of a simple design. It is further object to provide such an apparatus that works reliably and does not damage the paper product rolls.

The inventors are aware of no prior art which discloses or teaches this invention. Further objectives and advantages of the invention will become apparent in the descriptions which follow.

SUMMARY OF THE INVENTION

The invention comprises a roll infeed conveyor, for infeeding workpieces into a wrapping machine, having a squeezer conveyor, speed-up rollers, a bunching conveyor, an up-ending conveyor, a flight bar mechanism and a frame. A supply conveyor supplies a constant supply of workpieces to our invention. The workpieces are arranged axially with respect to the direction of motion and their respective ends about one another. The supply conveyor includes a conveyor belt having a low coefficient of friction so that the moving conveyor will not damage or scuff the workpieces. The abutting workpieces are fed from the supply conveyor into the squeezer conveyor such that a continuous column of workpieces is always present between the pair of squeezer conveyor belts that form the squeezer conveyor. As each workpiece is dispelled from the squeezer conveyor, the workpiece is accelerated by the speed-up rollers thus forming a gap between each workpiece. The bunching conveyor receives each separated workpiece from the speed-up rollers and groups multiple workpieces, if desired. The bunching conveyor comprises a conveyor belt having a smooth, slick low-friction surface and a separate carrier, such as a sprocket and chain, supporting a plurality of flight bars that move in generally the same path as the conveyor belt but a short a distance above the belt's surface. Each flight bar is timed to move to a point above the upper surface of the speed-up rollers and conveyor belt just behind each workpiece or group of workpieces which is to form a single group (typically two to four workpieces will be grouped). The flight bars move faster than the conveyor belt to an extent sufficient so that the workpieces which come from the speed-up rollers with gaps in between them are pushed together on the bunching conveyor to form a group with no spaces between the workpieces in the direction of advance. Typically, guide bars are also provided to group the workpieces in the lateral direction as they advance through our infeed conveyor.

The up-ending conveyor is positioned above the bunching conveyor and adjacent to the speed-up rollers. Each speed-up roller rotates at the same velocity as the other speed-up rollers. The up-ending conveyor includes an up-ending conveyor belt, a pair of conveyor rollers and an idler roller. The idler roller is biased by a spring to maintain a predetermined taughtness in the up-ending conveyor belt. As the individual workpieces are separated by the speed-up rollers, each workpiece is moved onto the bunching conveyor. As previously noted, the bunching conveyor has a low friction surface and operates at a fixed rate of speed. The up-ending conveyor belt has a higher friction surface than the bunching conveyor belt and operates at a rate of speed which is slower as compared to the bunching conveyor. When the leading upper edge of a workpiece just ejected from the speed-up rollers comes into contact with the up-ending conveyor belt, the high-friction surface of the up-ending conveyor engages with the workpiece leading edge. The up-ending conveyor does not have a back plate to support the top surface of the lower portion of the conveyor belt but has the spring biased idler roller so that the engaged workpiece can displace the conveyor belt between its conveyor rollers. Because the bunching conveyor is operating at a higher rate of speed than the up-ending conveyor, the lower trailing edge of the workpiece is accelerated while the upper leading edge is decelerated. This results in the workpiece being rotated substantially ninety-degrees. A workpiece positioned such that its longitudinal axis is parallel to the direction of motion is rotated, or up-ended, such that its longitudinal axis is perpendicular to the direction of motion.

By providing and positioning the high friction up-ending conveyor above the bunching conveyor adjacent to the speed-up rollers and operating the up-ending conveyor at a decreased rate of speed as compared to the bunching conveyor, workpieces engaged with both conveyors have their lower surfaces held at a constant rate of speed while their upper surfaces are decelerated, so that the workpieces pivot between the respective conveyors and are discharged from the infeed conveyor oriented substantially ninety-degrees from their original orientation. The presence of the up-ending conveyor having a higher friction conveyor belt and slower surface speed as compared to the bunching conveyor allows the ninety-degree rotation of the workpieces so that they may be packaged in the alternate configuration.

DESCRIPTION OF THE DRAWINGS

FIG. 2 is a side elevational view of the roll infeed conveyor.

FIG. 3 is a side elevational view of the roll infeed conveyor.

FIG. 4 is a side elevational view of the roll infeed conveyor.

FIG. 5 is a side elevational view of the roll infeed conveyor.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
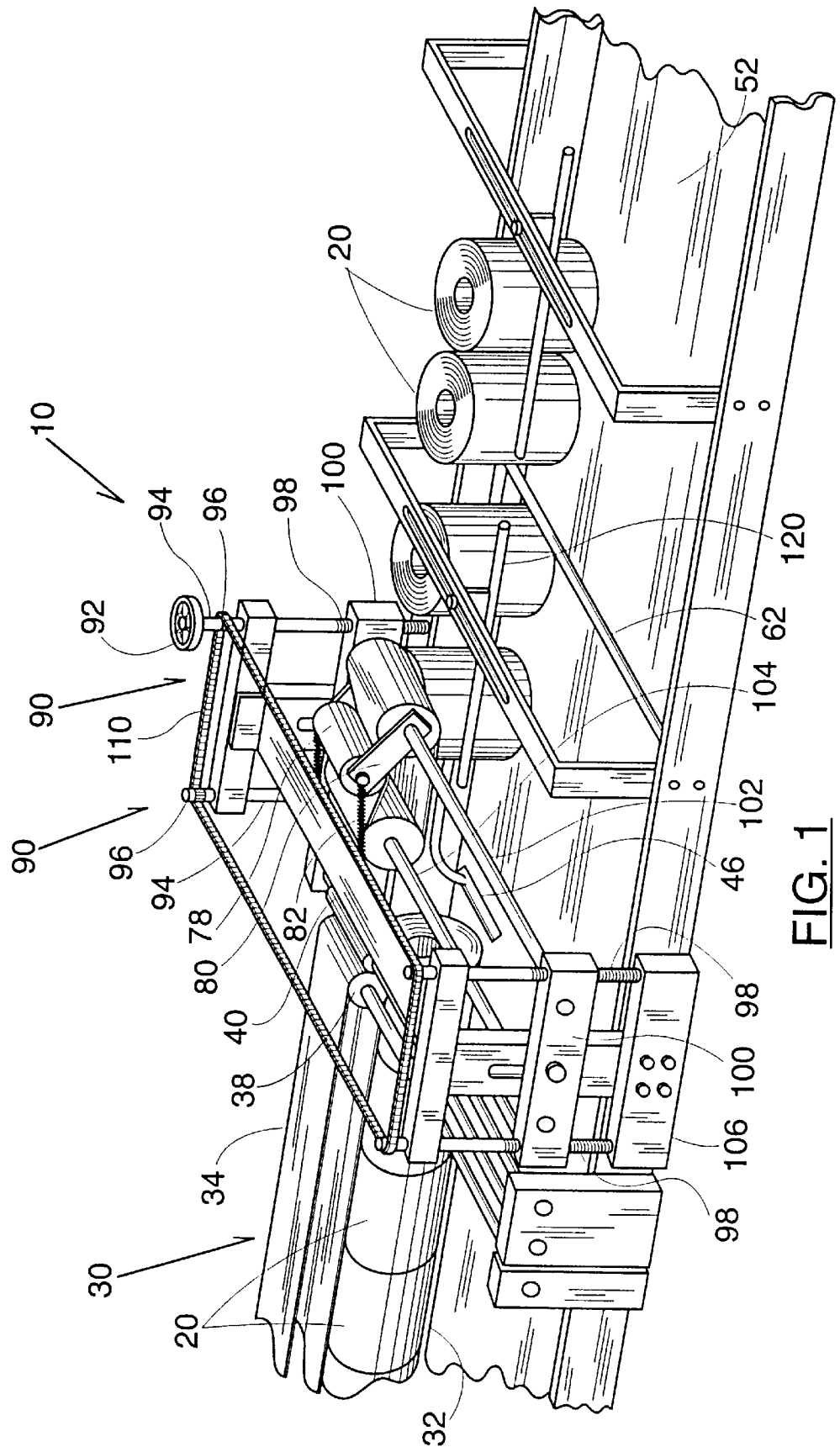
FIG. 1 is a front side perspective of the roll infeed conveyor incorporating our invention.

The present invention, shown generally at 10 in the drawings, is an infeed conveyor for up-ending or rotating workpieces 20 prior to wrapping. Our invention 10 comprises a first or squeezer conveyor section 30 consisting of a lower conveyor belt 32 and an upper conveyor belt 34 between which workpieces 20 are conveyed. The belts 32 and 34 rotate on rollers 36 and 38 respectively. The illustration in FIG. 1 depicts bathroom tissue (BRT) rolls 20 traveling in an axial direction as compared to the direction of motion and touching end to end while being confined between squeezer conveyor belt 32 and squeezer conveyor belt 34. The distance between conveyor belt 32 and conveyor belt 34 is less than the diameter of each workpiece roll 20. Conveyor belts 32 and 34 form the squeezer conveyor or first conveyor 30. Squeezer conveyor 30 has an input end (not shown) and an output end 39. Workpieces 20 are fed into the input end from a supply conveyor. The supply conveyor, which provides a continuous supply of workpieces 20 to the infeed conveyor 10, is not shown in the drawings. This type of conveyor is well known in the art.

At the output end 39, a number of conveying rollers, hereinafter called speed-up rollers 40, 42, 44, and 46, rotating at a higher speed than the surface speed of conveyor belts 32 and 34 are located. Speed-up rollers 40 and 44 lie in the same plane as upper belt 34 but rotate at a much higher surface speed. Speed-up rollers 42 and 46 lie in the same plane as lower belt 32 and rotate at the same speed as speed-up rollers 40 and 44. Squeezer conveyor 30 is adjusted to deliver the workpiece rolls 20 axially onto speed-up rollers 40, 42, 44, and 46 at a slightly modulating rate of speed.

Conveyor 50 receives the workpieces 20 that have been deposited onto it by the speed-up rollers 40, 42, 44, and 46. Conveyor 50 consists of a low-friction conveyor belt 52 and a pair of conveyor rollers 54 and 56. As can best be seen in FIGS. 2 through 6, there is also provided a flight bar conveyor 60. The flight bar conveyor 60 includes a plurality of flight bars 62 which are attached at predetermined distances along a pair of conventional chains 64. The chains 64 ride on sprockets which, for clarity, are not shown in the figures.

The leading flight bar sprockets and flight bar chains 64 are positioned such that the flight bars 62 emerge from below the plane formed by lower conveyor belt 32, lower speed-up rollers 42 and 46, and bunching conveyor belt 52. Further, the flight bars 62 emerge from the space between lower speed-up rollers 42 and 46.

The flight bars 62 are positioned around conveyor belt 52 and travel at a higher speed than the belt 52 so as to group the separated workpieces 20 together. The flight bars 62 are timed to emerge from below the speed-up rollers 42 and 46 in order to group together a predetermined number of workpiece rolls 20 that have been deposited on the bunching conveyor belt 52. FIGS. 1 through 6 depict a grouping of two workpieces 20. However, any number could be grouped. The flight bars 62 move faster than conveyor belt 52 so that the workpieces 20 can be grouped and placed in contact with one another before being fed into the packaging machine.

Figure 6:
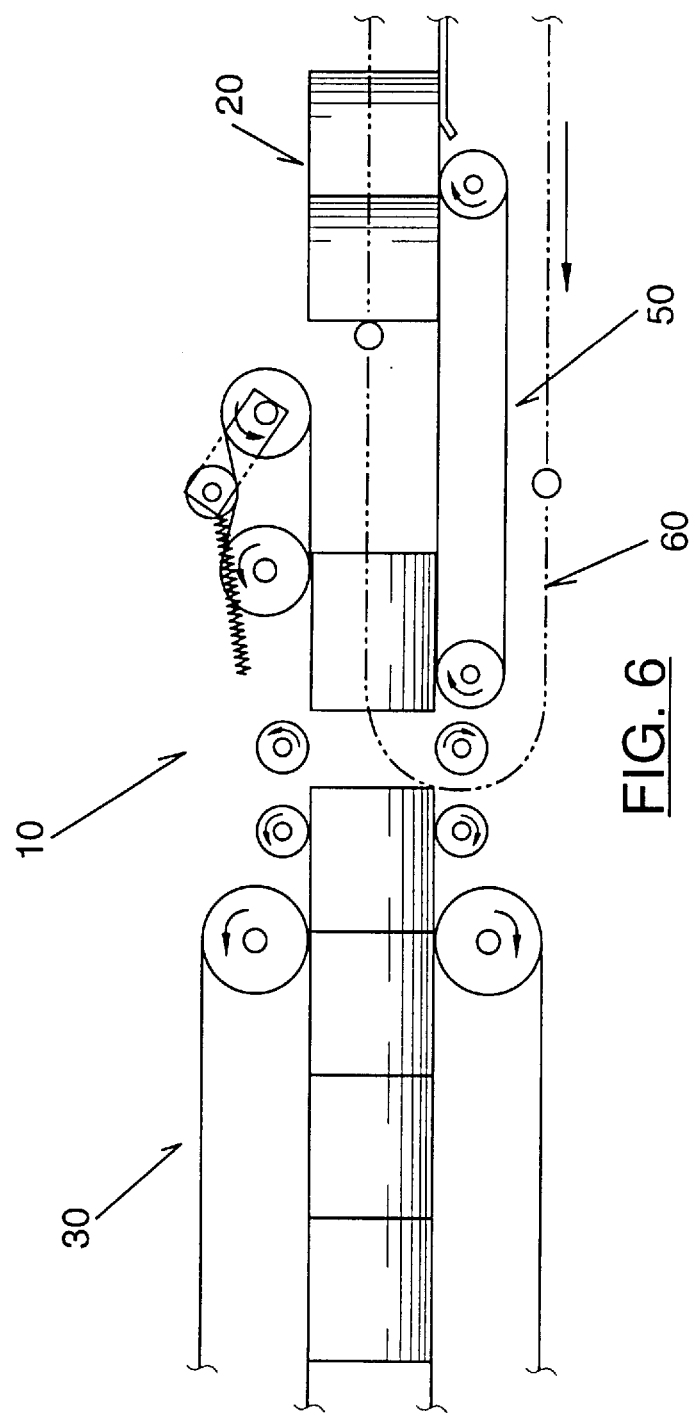
FIG. 6 is a side elevational view of the roll infeed conveyor.

Reference should now be made to FIGS. 2 through 6. As shown in FIG. 2, each workpiece 20 is ejected from speed-up rollers 40, 42, 44, and 46. After each workpiece 20 has been expelled by speed-up rollers 44 and 46 and deposited on conveyor 50, the upper leading edge 22 of the workpiece 20 comes into contact with up-ending conveyor 70. This is shown in FIG. 3. Up-ending conveyor 70 consists of an up-ending conveyor belt 72, a first belt roller 74, a second belt roller 76, and a belt idler roller 78. Roller 74 is a driven roller which is rotationally powered by the infeed conveyor 10. While roller 76 is not driven and rotates freely, it should be understood that roller 76 could be the driven roller while roller 74 could rotate freely. The conveyor 70 further includes an idler roller 78, a pair of idler arms 80, and a pair of idler springs 82. Without idler roller 78, conveyor belt 72 fits loosely and around rollers 74 and 76. Further there is not back plate to support the upper surface of the bottom portion of the belt 72. The idler roller 78, pair of idler arms 80, and pair of springs 82 remove the slack from the conveyor belt 72. Ends 84 of springs 82 are connected to a non-moving surface, such as the frame of the infeed conveyor 10. Up-ending conveyor 70 operates at a speed less than the speed of bunching conveyor 50. When the upper leading edge 22 of a workpiece roll 20 comes into contact with up-ending conveyor 70, the leading edge 22 is decelerated. At the same time, the bottom surface 24 of the workpiece 20 continues to move along belt 52 at a greater rate of speed. Again referring to FIG. 2, the differential in speed causes the workpiece 20 to begin to tip or rotate such that its front or leading side 26 is rotated upward while its previously rear or trailing side 28 is rotated downward. As the workpiece 20 continues to tip, its relative height between conveyor 50 and conveyor 70 increases. To compensate and prevent damage to the workpiece 20, the slack in conveyor belt 72 previously removed by idler roller 78 is now taken up by the workpiece 20. This is depicted in FIGS. 4 and 5. When the workpiece 20 is fully up-ended and conveyed beyond roller 76, the idler roller 78 again takes up the slack in up-ending conveyor belt 72 as shown in FIG. 6. It can also be seen that flight bar 62 comes into position behind the second workpiece 20 and guides the grouped workpieces into the wrapping machine..

Referring again to FIG. 1, it can be seen that up-ending conveyor 70 includes a height adjustment mechanism 90. If the distance between conveyor 50 and conveyor 70 is too great, none of the workpieces 20 will be up-ended by conveyor 70 because none of the workpiece leading upper edges 22 will make contact with the conveyor 70. If the distance between conveyor 50 and conveyor 70 is too small, the workpieces 20 will be crushed or damaged by up-ending conveyor 70 or the workpieces 20 will become lodged or jammed between the conveyors thus causing the need to shut down the entire infeed conveyor 10.

As shown in FIG. 1, the adjustment mechanism 90 consists of a hand wheel 92 mounted on an adjustment shaft 94. Three similar shafts 94 are mounted in a rectangular relationship across the infeed conveyor 10. A small sprocket 96 is mounted or formed in each shaft 94. The shafts 94 further each include a threaded portion 98 which is threadedly engaged with a pair of adjustment blocks 100. The pair of adjustment blocks 100 rotationally support first up-ending conveyor roller 74 and second up-ending conveyor roller 76. The rollers 74 and 76 are supported on shafts 102 and 104 which extend between the pair of adjustment blocks 100. Shaft 102 also supports idler arm 80 upon which idler roller 78 rotates. The pair of idler springs 82 bias idler roller 78 such that the slack in conveyor belt 72 is taken up. The bottoms of shafts 94 of adjustment mechanism 90 are rotationally supported by a pair of support blocks 106. Support blocks 106 are mounted to the frame or side-rail of the infeed conveyor 10.

A chain 110 is arranged in a rectangular fashion around each sprocket 96 as shown in FIG. 1. Thus when hand wheel 92 is rotated in a clockwise direction, each shaft 94 rotates an identical amount and the up-ending conveyor 70 is lowered toward bunching conveyor 50. Conversely, when hand wheel 92 is rotated in a counter-clockwise direction, the distance between up-ending conveyor 70 and bunching conveyor 50 is increased. As is also shown in FIG. 1, guide rails 120 maintain the workpiece 20's lateral position on conveyor belt 52. While FIG. 1 depicts a single lane of workpieces being separated, up-ended, grouped, and fed into the packaging machine, it should be noted that our invention 10 can be easily adopted for two, three, or any number of lanes while still performing its aforementioned functions.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An apparatus for up-ending workpieces in a conveyor system comprising:
    a first conveyor which advances the workpieces in axial end-to-end contact;
    at least one upper speed-up roller and at least one lower speed-up roller, the rollers being disposed one above the other and adjacent to the first conveyor;
    a second conveyor comprising a belt supported on at least one roller, said second conveyor being located adjacent to said speed-up rollers;
    said second conveyor belt arranged to be moved at a predetermined rate of speed;
    an up-ending conveyor comprising a loosely fitting, continuous belt supported on and suspended between laterally spaced rollers and providing oppositely disposed upper and lower belt portions, said rollers each having a longitudinal axis lying in a plane parallel with the plane of said second conveyor belt, said lower belt portion being located a predetermined distance above said second conveyor belt and arranged for engagement with the leading edge of said advancing workpiece;
    a frame structure for supporting said up-ending conveyor;
    a spring-biased idler roller bearing against the upper belt portion for normally tightening said, loosely fitting, up-ending conveyor belt to maintain the parallel relationship between said lower belt portion and said second conveyor belt;
    said up-ending conveyor belt arranged to be moved at a rate of speed less than the rate of speed of the second conveyor belt;
    wherein the frame structure of the conveyor system supports a height adjustment mechanism arranged to raise and lower the coplanar up-ending conveyor rollers and being capable of adjusting the predetermined distance between the second conveyor belt and said coplanar upending conveyor rollers.

2. The apparatus of claim 1 wherein the up-ending conveyor has a high-friction surface.

3. A method of rotating workpieces supported on an infeed conveyor consisting of a linear series of a workpiece conveyor and an up-ending conveyor, said conveyors each comprising continuous belts to move workpieces, the belt of said up-ending conveyor consisting of a single loosely fitting belt including oppositely disposed upper and lower belt portions,
    said method comprising the steps of:
        suspending said loosely fitting belt between laterally spaced, supporting up-ending conveyor rollers with said lower belt portion being disposed over a portion of said workpiece conveyor, the axes of said up-ending conveyor rollers lying in a plane parallel with the plane of said workpiece conveyor belt;
        locating the lower portion of said up-ending conveyor belt in parallel relationship with the workpiece conveyor belt;
        operating said workpiece conveyor belt at a speed greater than the speed of said up-ending conveyor belt;
        discharging a workpiece onto said workpiece conveyor;
        providing a spring-biased idler roller contacting said upper belt portion to normally tighten the up-ending conveyor belt to maintain the parallel relationship between said coplanar up-ending conveyor rollers and said second conveyor belt;
        providing a height adjustment mechanism arranged to raise and lower the coplanar up-ending conveyor rollers and being capable of adjusting the predetermined distance between the second conveyor belt and said coplanar up-ending conveyor rollers;
        engaging a leading edge of the workpiece with said lower belt portion of said up-ending conveyor belt;
        rotationally up-ending the workpiece between said workpiece conveyor belt and said lower belt portion of said up-ending conveyor, whereby the workpiece is rotated substantially ninety degrees from its original orientation.

4. The method of claim 3 including a first step of creating a gap between the workpieces.

5. The apparatus of claim 1, wherein said height adjusting mechanism includes at least one manually operable threaded adjustment shaft and a support block for said up-ending threadingly engagable with said shaft.

* * * * *